United States Patent Office 3,324,139
Patented June 6, 1967

3,324,139
3-(3-HYDROXYPHENYL)-1-PHENACYL-PIPERIDINE COMPOUNDS
Hiroshi Kugita, Daito, Goro Hayashi, Toyonaka, Toyonari Oine, Osaka, Hirozumi Inoue, Yao, and Seiichi Nurimoto, Osaka, Japan, assignors to Tanabe Seiyaku Co., Ltd., Osaka, Japan
No Drawing. Filed Sept. 14, 1964, Ser. No. 396,381
Claims priority, application Japan, Sept. 18, 1963, 38/50,127; Mar. 3, 1964, 39/11,880; July 18, 1964, 39/41,061
5 Claims. (Cl. 260—294.7)

This invention relates to new chemical compounds which are useful as analgesics. These compounds are derivatives of 3-(3-hydroxyphenyl) - 1-phenacyl-piperidine and are represented by the following formula:

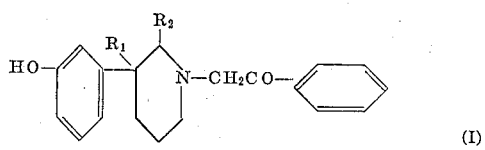

(I)

wherein $R_1$ represents a member selected from the class consisting of lower alkyl and benzyl, $R_2$ represents a member of a class consisting of hydrogen and lower alkyl.

We have found that the above mentioned 3-(3-hydroxyphenyl)-1-phenacyl-piperidine compounds are useful as analgesics. Among them, 3-(3-hydroxyphenyl)-3-methyl-1-phenacyl-piperidine shows an analgesic effect as great as that of meperidine but is less toxic than meperidine. The analgesic effect and the toxicity in mice are shown in Table 1 with comparison to those of meperidine and codeine.

TABLE 1

| | Analgesic $ED_{50}$[1] (mg./kg.) | Toxicity $LD_{50}$[2] (mg./kg.) | $LD_{50}/ED_{50}$ |
|---|---|---|---|
| 3-(3-hydroxyphenyl)-3-methyl-1-phenacyl-piperidine | 12.1 | 368.0 | 30.4 |
| Meperidine | 12.5 | 273.5 | 21.9 |
| Codeine | 24.3 | 231.2 | 9.5 |

[1] Calculated from the pain reaction time of each group of ten mice on the hot plate at 55° C.
[2] Calculated from the mortality of groups of five mice for 24 hours after subcutaneous administration.

These new compounds can be prepared by reacting phenacyl halide such as phenacyl bromide or phenacyl chloride with a 3-(3-methoxyphenyl)-piperidine compound of the formula:

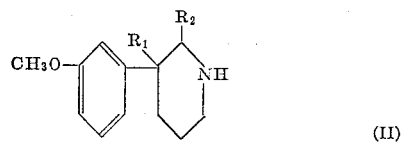

(II)

in which $R_1$ and $R_2$ have the same significance as described above, in the presence of potassium carbonate to obtain corresponding N-phenacyl compound and hydrolysing the product with hydrohalic acid.

This can be preferably carried out in an organic solvent such as acetone, methanol, ethanol, propanol, or aqueous mixtures thereof. The reaction is advantageously carried out at the boiling point of the reaction mixture. Potassium carbonate may be replaced by another acid acceptor such as sodium carbonate, alkali metal bicarbonates, alkali metal hydroxides, pyridine, etc. An excess of the starting amine may be also used for this purpose as well. After this step, the remaining part of the starting compound may be removed from the reaction mixture in the form of its N-acetyl derivative.

3-(3-methoxyphenyl)-1-phenacyl-piperidine compounds which have been obtained by the above mentioned procedure are then hydrolyzed with hydrohalic acid, such as hydrochloric acid or hydrobromic acid to obtain the final products by cleavage of the ether linkage. The products of this invention form acid addition salts with various inorganic or organic acids, such as hydrochloric, hydrobromic, sulfuric, acetic, oxalic acids. Examples of the starting piperidine compounds represented by the Formula II are as follows:

3-(3-methoxyphenyl)-3-methyl-piperidine,
3-ethyl-3-(3-methoxyphenyl)-piperidine,
2,3-dimethyl-3-(3-methoxyphenyl)-piperidine,
3-(3-methoxyphenyl)-2-methyl-3-propyl-piperidine
and
3-benzyl-3-(3-methoxyphenyl)-2-methyl-piperidine.

Those of said compounds where $R_2$ is hydrogen can be prepared by the process described in "Chemical and Pharmaceutical Bulletin," Vol. 11, pages 253–257.

Those having a lower alkyl substituent at the 2-position of the piperidine ring may be prepared by hydrolyzing 2-benzyl- or 2-lower alkyl-2-(3-methoxyphenyl)-acetonitrile to yield the corresponding carboxylic acid, reacting said carboxylic acid with alkyl-lithium to obtain the corresponding ketone, reacting said ketone with acrylonitrile in the presence of a basic catalyst such as Triton B, and reducing the addition product with Raney nickel under pressure to form the piperidine nucleus. The following Examples A and B illustrate the preparation of 2,3-dimethyl-3-(3-methoxyphenyl)-piperidine and 3-benzyl-3-(3-methoxyphenyl)-2-methyl-piperidine.

EXAMPLE A 50 g. of 2-(3-methoxyphenyl)-propionitrile was added to the mixture of 33 ml. of glacial acetic acid, 36 ml. of concentrated sulfuric acid and 28 ml. of water. The mixture was stirred for 3.5 hours at 90–100° C. and refluxed for additional 30 minutes at 130° C. Water was added to the reaction mixture and separated oil was extracted with water. The ethereal layer was washed with water and extracted with 10% sodium carbonate. Aqueous layer thereof was acidified with concentrated hydrochloric acid and re-extracted with ether. After off the ether, the residue was distilled under reduced pressure, whereby 45 g. of 2-(3-methoxyphenyl)-propionic acid was obtained. (B.P. 156–157° C./2 mm. Hg.)

30 ml. of absolute ether solution containing 15 g. of the thus-obtained product was dropped into 200 ml. of absolute ether solution containing 0.33 mol of methyllithium with stirring at 0–5° C. within 25 minutes. The reaction mixture was stirred at the same temperature for additional 30 minutes and poured into ice water containing ammonium chloride. The ethereal layer was separated, washed with 10% sodium carbonate and water successively, dried with anhydrous sodium sulfate and evaporated to remove ether. The residue was distilled under reduced pressure, whereby 14.2 g. of 3-(3-methoxyphenyl-butan-2-one was obtained as an oily product. (B.P. 135–140° C./15 mm. Hg.) To 70 ml. of a solution containing 15.8 g. of the product in dioxane, 1.5 ml. of Triton B (40% aqueous solution of benzyltrimethyl-ammonium hydroxide) was added. 6.1 g. of acrylonitrile was dropped with stirring into the mixture within 30 minutes.

The reaction mixture was stirred for additional 30 minutes at 45–50° C. and cooled. Dioxane was removed by evaporation, the residue was extracted with ether after the addition of an amount of water to the residue. The extract was dried, evaporated to remove ether, and the residue was distilled under reduced pressure, whereby 16.6 g. of oil, 4-acetyl-4-(3-methoxyphenyl)-n-valeronitrile was obtained. (B.P. 145–150°° C./0.1 mm. Hg.) 15 g. of the resultant product and 15 ml. of Raney nickel were added to 80 ml. of methanol and the mixture was placed in an autoclave. Hydrogen gas was filled in the autoclave until the pressure reached 90 kg./cm.$^2$, then the autoclave was shaken for 2 hours at 120–130° C. The reaction mixture was filtered and the filtrate was evaporated to remove methanol. The residue was extracted with ether after addition of an amount of water to the residue. The ethereal extract was extracted with 10% hydrochloric acid. The extract was alkalified with potassium carbonate and the separated oil was extracted with ether. The ethereal extract was dried and evaporated to remove ether. The residue was distilled under reduced pressure, whereby 12.0 g. of colorless oil, 2,3 - dimethyl - 3 - (3 - methoxyphenyl)-piperidine, was obtained. (B.P. 138–140° C./4 mm. Hg.) The product showed a single peak in its gas chromatography. The hydrochloride: colorless prisms melting at 226–228° C. after recrystallization from ethanol.

*Analysis.*—Calculated for $C_{14}H_{21}NO \cdot HCl$: C, 65.74; H, 8.67; N, 5.48. Found: C, 65.84; H, 8.30; N, 5.42.

EXAMPLE B 41 g. of 2-(3-methoxyphenyl) - 3 - phenyl-propionitrile was added to a mixture consisting of 30 ml. of water, 42 ml. of glacial acetic acid and 42 ml. of concentrated sulfuric acid, and the mixture was refluxed for one hour. The reaction mixture was treated as Example A. 37 g. of 2-(3-methoxyphenyl)-3-phenyl-propionic acid was obtained. (B.P. 175–185° C./0.4 mm. Hg.) 50 ml. of absolute ether solution containing 37 g. of the product was dropped into a solution of 8.0 g. of lithium and 82 g. of methyl iodide in 350 ml. of absolute ether at 2–3° C. with stirring within 30 minutes. The reaction mixture was stirred for additional 30 minutes at 5–10° C. and was treated as in Example A. Thus, 34.5 g. of 3-(3-methoxyphenyl)-4-phenyl-butane-2-one was obtained (B.P. 136–137° C./0.3 mm. Hg.)

1.2 ml. of Triton B was added to 65 ml. of dioxane solution containing 20 g. of the product. 20 ml. of a solution dissolving 5 g. of acrylonitrile in dioxane was dropped into the mixture at 20–36° C. and the mixture was stirred for 45 minutes at 40° C. The reaction mixture was treated as in Example A, and 18.6 g. of 4-acetyl-4-(3-methoxyphenyl)-5-phenyl-n-valeronitrile was obtained. (M.P. 119–120° C.) 17.5 g. of the product and 13 ml. of Raney nickel were added to 90 ml. of methanol and autoclaved for one hour at 110–120° C. The reaction mixture was treated as described in Example A. 13 g. of 3-benzyl-3-(3-methoxyphenyl)-2-methyl-piperidine was obtained. The perchlorate: colorless needles melting at 183–185° C. after recrystallization from acetone-ether.

*Analysis.*—Calculated for $C_{20}H_{26}O_5N$ Cl: C, 60.68; H, 6.62; N, 3.54. Found: C, 61.00; H, 6.54; N, 3.50.

*Example 1*

2 g. of 3-(3-methoxyphenyl)-3-methyl-piperidine was added to a solution consisting of 2.0 g. of phenacyl bromide, 1.5 g. of potassium carbonate and 30 ml. of ethanol, and the mixture was refluxed for 2 hours on a water bath. The reaction mixture was poured into water and extracted with ether. After drying, a methanol solution of hydrogen bromide was added to the ethereal extract, whereby the crystals of 3-(3-methoxyphenyl)-3-methyl-1-phenacyl-piperidine hydrobromide were precipitated. Colorless needles melting at 183–185° C. after recrystallization from acetone-ethanol-ether. Yield: 2.5 g.

*Analysis.*—Calculated for $C_{21}H_{26}BrNO_2$: C, 62.37; H, 6.48; N, 3.46. Found: C, 62.31; H, 6.61; N, 3.98.

2.0 g. of the hydrobromide was refluxed for 30 minutes with 10 ml. of 48% hydrobromic acid. The mixture was distilled under reduced pressure to remove hydrogen bromide. The residue was dissolved in water, alkalified with ammonia and extracted with ethyl acetate. The extract was dried and the solvent was removed by evaporation. The residue was dissolved in acetone and hydrogen chloride gas was bubbled into the solution, whereby 3-(3-hydroxyphenyl)-3-methyl-1-phenacyl-piperidine hydrochloride was obtained. Colorless needles melting at 227–229° C. after recrystallization from acetone-ethanol-ether. Yield: 1.4 g.

*Analysis.*—Calculated for $C_{20}H_{24}ClNO_2$: C, 69.45; H, 6.99; N, 4.04. Found: C, 69.45; H, 7.03; N, 4.08.

*Example 2*

In accordance with the same procedure as described in Example 1 except that 3-(3-methoxyphenyl)-3-n-propyl-piperidine was used instead of 3-(3-methoxyphenyl)-3-methyl-piperidine, 3-(3-methoxyphenyl)-1-phenacyl-3-n-propyl-piperidine was prepared. The hydrochloride: M.P. 170–172° C. The hydrochloride was hydrolyzed as in Example 1, whereby 1-phenacyl-3-n-propyl-3-(3-hydroxyphenyl)-piperidine hydrochloride was obtained. The hydrochloride is amorphous powder which shows no definite melting point.

*Example 3*

2.0 g. of 2,3-dimethyl-3-(3-methoxyphenyl)-piperidine, 1.9 g. of phenacyl bromide and 2.0 g. of anhydrous potassium carbonate were dissolved in 40 ml. of ethanol and refluxed for 3 hours. After filtration, the reaction mixture was evaporated to remove ether. The residue was extracted with ether, dried with anhydrous potassium carbonate, and evaporated to remove ether. The remaining oil was converted to hydrobromide and recrystallized from ethanol, whereby colorless prisms of 2,3-dimethyl-3-(3-methoxyphenyl)-1-phenacyl-piperidine hydrobromide were obtained. Yield: 2.0 g. M.P. 199–201° C.

*Analysis.*—Calculated for $C_{22}H_{27}NO_2 \cdot HBr$: C, 63.15; H, 6.75. Found: C, 63.46; H, 6.58.

1.2 g. of the hydrobromide was treated with 48% hydrobromic acid, whereby colorless needles of 2,3-dimethyl-3-(3 - hydroxyphenyl)-1-phenacyl-piperidine hydrobromide were obtained. Yield: 0.8 g. M.P. 219–221° C. (recrystallized from ethanol).

*Analysis.*—Calculated for $C_{21}H_{25}NO_2 \cdot HBr$: C, 62.37; H, 6.48. Found: C, 62.41; H, 6.21.

*Example 4*

1.7 g. of 3-(3-methoxyphenyl)-2-methyl-3-n-propyl-piperidine was mixed with 1.6 g. of phenacyl bromide and 1.7 g. of anhydrous potassium carbonate in 30 ml. of acetone. The mixture was refluxed for 10 minutes, filtered and evaporated to remove acetone. The residue was dissolved in ether, washed with water and shaken with 100 ml. of 5% hydrochloric acid. Ether was removed from the mixture. The residue was washed with ether, alkalified with potassium carbonate, extracted with ether. The extract was dried, and the ether was removed by evaporation. A small amount of ether and petroleum ether were added to the residue successively, whereby crystals of 3-(3 - methoxyphenyl) - 2 - methyl - 1 - phenacyl - 3 - n - propyl-piperidine were obtained. Yield: 1.2 g. M.P. 106–114° C.

By concentrating the mother liquor, 0.2 g. of the product was obtained. The hydrochloride: needles melting at 183–185° C. after recrystallization from acetone-ethanol-ether. Yield: 1.5 g. The purified crystal: M.P. 188–190° C.

*Analysis.*—Calculated for $C_{24}H_{32}O_2NCl \cdot \frac{1}{2}H_2O$: C, 70.30; H, 8.11; N, 3.41; Found: C, 70.45; H, 8.21; N, 3.37.

1 g. of the hydrochloride was refluxed for 30 minutes with 6 ml. of 47% hydrobromic acid in acetic acid. After removing the solvents, the residue was treated with acetone, whereby needles of 3-(3-hydroxyphenyl)-2-methyl-1-phenacyl-3-n-propyl piperidine were obtained. Yield: 1.07 g. M.P. 235–237° C. (recrystallized from acetone-methanol-ether). The hydrochloride: M.P. 225–229° C. Yield: 0.9 g. M.P. 219–221° C. Yield: 0.8 g. (from methanol-acetone).

*Analysis.*—Calculated for $C_{23}H_{30}O_2N$ Cl: C, 71.21; H, 7.80; N, 3.61. Found: C, 71.16; H, 7.51; N, 3.68.

Example 5

2. g. of 3-benzyl-3-(3-methoxyphenyl)-2-methyl-piperidine was refluxed for 10 hours with 1.6 g. of phenacyl bromide and 2.0 g. of anhydrous potassium carbonate in 50 ml. of acetone. The reaction mixture was filtered and the filtrate was evaporated to remove acetone. The residue was dissolved in ether, washed with water, dried with anhydrous potassium carbonate and the ether was removed by evaporation. The remaining oil was converted to the hydrochloride, recrystallized from acetone-ether, whereby colorless needles of 3-benzyl-(3-methoxyphenyl)-2-methyl-1-phenacyl-piperidine hydrochloride were obtained. M.P. 142–144° C. with decomposition. Yield: 2.9 g.

*Analysis.*—Calculated for $C_{28}H_{32}O_2NCl \cdot H_2O$: C, 71.85; H, 7.30; N, 2.99. Found: C, 71.66; H, 7.03; N, 3.00.

1.5 g. of the hydrochloride was hydrolyzed with 5 ml. of 47% hydrobromic acid by procedure similar to that described in Example 1, whereby 3-benzyl-3-(3-hydroxyphenyl)-2-methyl-1-phenacyl-piperidine was obtained. The hydrochloride: needles melting at 182–184° C. with decomposition (recrystallized from acetone-methanol).

*Analysis.*—Calculated for $C_{27}H_{30}O_2HBr \cdot \tfrac{1}{2}H_2O$: C, 66.25; H, 6.38; N, 2.86. Found: C, 66.60; H, 6.14; N, 2.78.

What we claim is:

1. A member selected from the group consisting of compounds of the formula

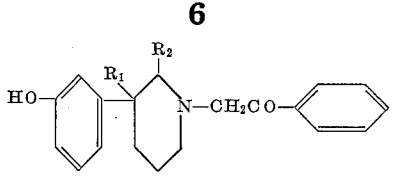

and pharmaceutically acceptable acid addition salts thereof, wherein $R_1$ is a member selected from the group consisting of lower alkyl and benzyl, and $R_2$ is a member selected from the group consisting of H and lower alkyl.

2. 1 - phenacyl - 3-methyl-3-(3-hydroxyphenyl)-piperidine.

3. 1 - phenacyl-2,3-dimethyl-(3-hydroxyphenyl)-piperidine.

4. 1 - phenacyl-2,3-dimethyl-(3-hydroxyphenyl)-piperidine hydrobromide.

5. 1 - phenacyl-2,3-dimethyl-(3-hydroxyphenyl)-piperidine hydrochloride.

References Cited

UNITED STATES PATENTS

| | | | |
|---|---|---|---|
| 2,892,842 | 6/1959 | McElvain | 260—294.7 |
| 3,080,372 | 3/1963 | Janssen | 260—294.7 |
| 3,242,170 | 3/1966 | Merz et al. | 260—294.7 |

OTHER REFERENCES

Braenden, Bull Wld. Hlth. Org., p. 964, vol. 13, 1955.

Eddy., J. Am. Pharm. Assoc., pp. 245–248 and 251, vol. XXXIX, No. 5, May 1950 (Science Ed.).

Fiser et al., Adv. Org. Chem., pp. 308–309, Reinhold (1961), New York.

Janssen, J. of Med. Chem., vol. 2, No. 1, pp. 31, 34, 35, 43 and 44 (1960).

McElvain et al., J. Am. Chem. Soc., vol. 80, pp. 3915–3918 and 3922, August 1958.

WALTER A. MODANCE, *Primary Examiner.*

A. D. SPEVACK, *Assistant Examiner.*